United States Patent [19]
Bito et al.

[11] Patent Number: 5,296,319
[45] Date of Patent: Mar. 22, 1994

[54] NON-AQUEOUS ELECTROLYTE SECONDARY BATTERY

[75] Inventors: Yasuhiko Bito, Yao; Masaki Hasegawa, Hirakata; Shuji Ito, Kadoma; Hiroyuki Murai, Hirakata, Japan; Yoshinori Toyoguchi, Yao, all of Japan

[73] Assignee: Matsushita Electric Industrial Co., Ltd., Osaka, Japan

[21] Appl. No.: 891,633

[22] Filed: Jun. 1, 1992

[30] Foreign Application Priority Data

May 30, 1991 [JP] Japan ................. 3-127322

[51] Int. Cl.$^5$ ............................. H01M 10/40
[52] U.S. Cl. ..................... 429/194; 429/197; 429/218
[58] Field of Search ............ 429/194, 197, 218

[56] References Cited

U.S. PATENT DOCUMENTS 4,980,250  12/1990  Takahashi et al. ............... 429/194

FOREIGN PATENT DOCUMENTS 1-32067  5/1989  Japan .
1-34872  5/1989  Japan .

Primary Examiner—Prince Willis, Jr.
Assistant Examiner—M. Nuzzolillo
Attorney, Agent, or Firm—Ratner & Prestia

[57] ABSTRACT

A non-aqueous electrolyte secondary battery comprises rechargeable positive and negative electrodes and a non-aqueous electrolyte. The positive electrode comprises at least one selected from $LiCoO_2$, $LiMn_2O_4$ and $LiNiO_2$ and the negative electrode consists most of alkai metals such as lithium, etc. The non-aqueous electrolyte contains lithium salts and has concentration ranging from 0.002 to 1.0 mol/liter of at least one acid anhydride selected from acetic anhydride, benzoic anhydride, succinic anhydride, phtalic anhydride and maleic anhydride.

3 Claims, 2 Drawing Sheets

NON-AQUEOUS ELECTROLYTE SECONDARY BATTERY

BACKGROUND OF THE INVENTION

1. Field of the Invention

This invention relates to a non-aqueous electrolyte secondary battery, particularly relating to one with an improved electrolyte.

2. Description of the Prior Art

Various studies have been carried out relating to non-aqueous electrolyte secondary batteries with a negative electrode that is composed of lithium metal, lithium alloy or a lithium compound for meeting the requirements of high voltage and high energy density applications.

Particularly, the use of $MnO_2$ or $TiS_2$ as the positive active materials for these batteries has been examined. These positive active materials show an electric potential of about 3 V as compared with Li.

$LiMn_2O_4$ and $LiCoO_2$ and also $LiNiO_2$ when used as the positive active materials show an electric potential of higher than 4 V and are receiving great attention.

In other words, great efforts are being made to increase battery voltage in addition to expansion of battery capacity for the purpose of gaining a high energy density from batteries. $LiCoO_2$, in particular, is considered as a promising positive active material since it provides the possibility of large discharge capacity and excellent charge and discharge cycle characteristics.

Furthermore, adding one or more of Mn, Cr and Fe to $LiCoO_2$ is tried in order to improve the charge and discharge cycle characteristic that makes one of the important characteristics required of secondary batteries.

SUMMARY OF THE INVENTION

Use of such positive active materials as $LiCoO_2$, $LiMn_2O_4$, $LiNiO_2$ and the like realizes a non-aqueous electrolyte secondary battery of large discharge capacity and excellent charge and discharge cycle characteristics but such a battery has the problem of poor high temperature storage characteristics because of the charge voltage exceeding 4 V.

When secondary batteries are stored at a high temperature, resolving of the water contained in the batteries in extremely small quantities and also of the solvent in electrolyte presents problems of increased internal resistance and decreased charge and discharge capacity to the batteries. These adverse effects are enhanced as the battery voltage becomes high and the storage temperature is increased.

Regarding the water brought into the batteries in an extremely small quantity, its amount is to be reduced as much as possible by a refinery processing such as distillation treatment of electrolyte and by drying of positive active materials.

However, in the case of secondary batteries where cycling of charge and discharge takes place and especially for batteries of charge voltage exceeding 4 V, the foregoing pretreatment of water elimination alone does not guarantee good high temperature storage characteristics.

Under the above conditions, reactions between positive active materials and electrolyte solvent are easily in progress and the product from such reactions then reacts with negative active materials. Consequently, it is considered to lead to deterioration in the performance of the batteries.

An object of this invention is to provide a non-aqueous electrolyte secondary battery of improved high temperature storage characteristics by solving the foregoing problems.

The non-aqueous electrolyte secondary battery of this invention employs positive and negative electrodes that are reversible against charge and discharge cycles and a non-aqueous electrolyte that comprises lithium salts and is added with acid anhydrides.

Also, the active material of the positive electrodes should preferably be at least one selected from $LiCoO_2$, $LiMn_2O_4$ and $LiNiO_2$.

Moreover, the acid anhydride should preferably be at least one selected from acetic anhydride, benzoic anhydride, succinic anhydride, phtalic anhydride and maleic anhydride.

Further, the concentration of the acid anhydrides should preferably be ranging from 0.002 to 1.0 mol/liter.

According to the above composition, the acid anhydride of the non-aqueous electrolyte secondary battery of this invention is anhydrous carboxylic acid, which corresponds to acyl oxide.

The lower anhydrous carboxylic acid turns to liquid and the higher one to solid. Either of them readily reacts with water or alkali and turns to acid or its salt.

This means the function performed by acid anhydride within a non-aqueous electrolyte secondary battery can be said to exist in its strong reaction with water in acid anhydrides or with alkali.

For instance, when acetic anhydride reacts with water or alkali, acetic acid or its salt is produced. Therefore, acid anhydrides assumedly react strongly with water contained in organic electrolyte in extremely small quantities with a resultant reduction of the water content of the organic electrolyte.

Also, in view of the reaction of acid anhydride with alkali, its effects to alkali like LiOH that may be contained in the positive active materials of this invention have to be considered to exist.

Consequently, by having acid anhydride included in positive electrodes, reduction of the water content or the residual alkali within batteries is made possible with a resultant prevention of the battery performance deterioration occurring at high temperature storage and assumedly caused by the existence of water or residual alkali.

DETAILED DESCRIPTION OF PREFERRED EMBODIMENTS

With regard to this invention of a non-aqueous electrolyte secondary battery, a detailed description of the preferred embodiments is given in the following with a help of drawings: Throughout the description, $LiCoO_2$ is used as a positive active material.

Example 1

Figure 1:
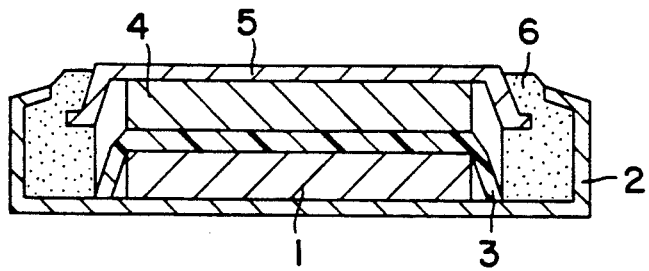
FIG. 1 shows a cross-sectional drawing of the non-aqueous electrolyte secondary batteries as described in the examples of this invention.

A battery is prepared as follows:

A positive electrode composition is made by mixing first 100 g of $LiCoO_2$ as a positive active material and 3.0 g of acetylene black as a conductive material, further with an addition of 4.0 g of poly 4 ethylene fluoride resin as a binder. The positive electrode in an amount of 0.1 g is press molded into 17.5 mm in diameter by 1 ton/cm$^2$ pressing to make a positive electrode. As shown in FIG. 1, a molded positive electrode 1 is placed in a case 2.

Over the positive electrode 1, a porous polypropylene film is placed as a separator 3. A negative electrode 4 of a lithium plate that measures 17.5 mm in diameter and 0.3 mm in thickness is attached by pressing to a sealing plate 5 which is put together with a polypropylene gasket 6.

A non-aqueous electrolyte is prepared first by adding acetic anhydride to propylene carbonate solution to the concentration of 0.001 to 2,0 mol/liter, wherein 1 mol/liter lithium perchlorate solution is then dissolved. Altogether, 14 different cases of acetic anhydride concentration ranging from 0.001 to 2.0 mol/liter are examined as listed in Table 1.

The non-aqueous electrolyte thus prepared is applied over the separator 3 and the negative electrode 4. Then, the whole battery is sealed by curling the upper edges of the case 2.

In order to see differences, a battery using a non-aqueous electrolyte with no inclusion of acetic anhydride is made. In other words, a non-aqueous electrolyte prepared by ressolving 1 mol/liter of lithium perchlorate in polycarbonate solution is used to build a battery.

Battery's high temperature storage tests are conducted according to the following method:

The batteries prepared by the foregoing methods are charged to 4.2 volts and then discharged down to 3 volts under the condition of 20° C. and the constant current of 1 mA. At the end of 11th charge after 10 cycles of the above charge and discharge testing, the batteries are stored for 4 weeks at 60° C. Then, the batteries are discharged after they are returned to 20° C. Here, the capacity holding rate is defined as follows:

Capacity holding rate = 100 × 11th cycle's quantity of discharge electricity/10th cycle's quantity of discharge electricity. Also, after the above measurement the batteries are recharged and the discharge capacity is examined.

Figure 2:
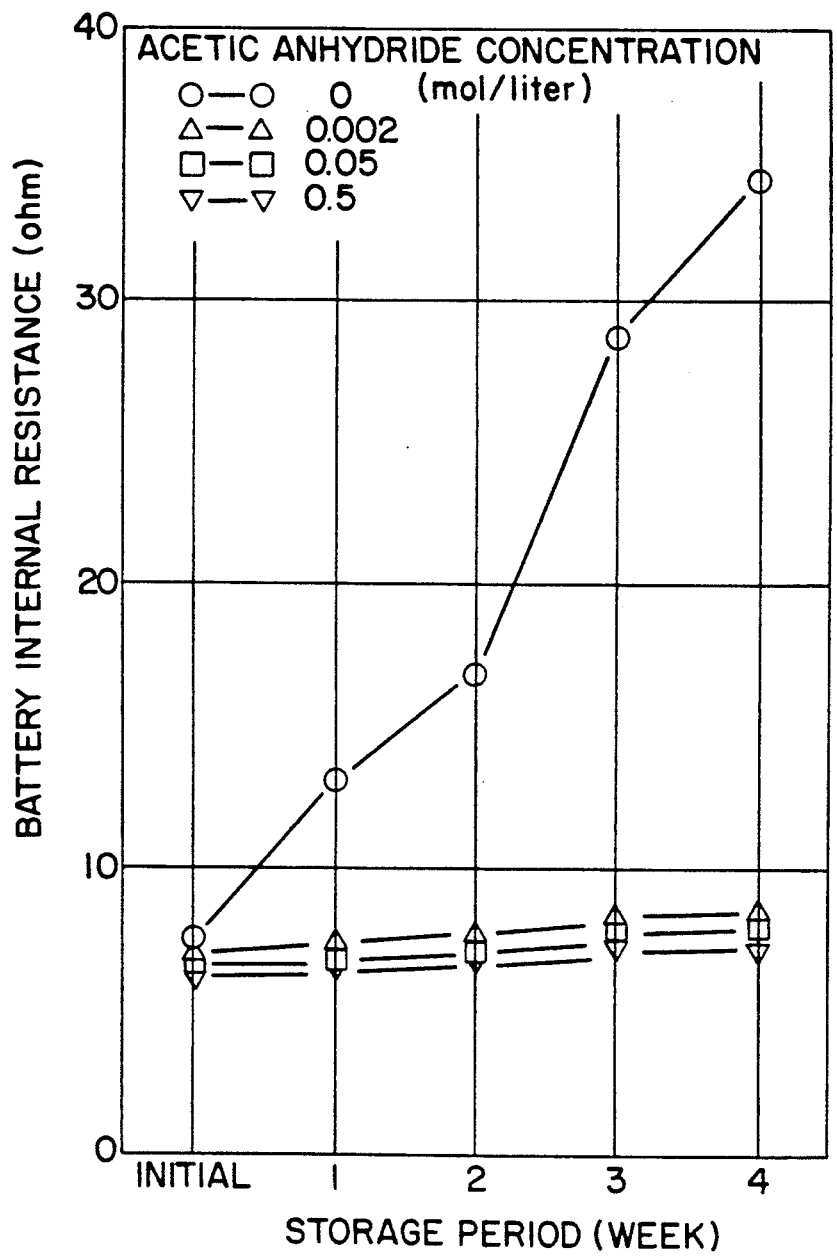
FIG. 2 is a graph to show changes in the internal resistance of the battery explained in Example 1 and stored at 60 C.

At this point, the capacity recovery rate is defined as follows:

Capacity recovery rate = 100 × 12th cycle's quantity of discharge electricity/10th cycle's quantity of discharge electricity. FIG. 2 shows changes in internal resistance of the foregoing batteries after being stored at 60° C. for 4 weeks. The internal resistance is measured at 20° C. under the condition that the bias voltage is same as the battery voltage, the frequency is 1.0 kHz and the amplitude is 100 mV.

With the battery prepared by using no acetic anhydride for a comparison purpose, it is observed that the internal resistance increases sharply immediately after the start of storage reaching as high as above 30 ohms after a 4 week storage at 60° C. On the other hand, with the batteries of this invention's embodiment, the internal resistance increase remains small.

Also, Table 1 shows the capacity holding rate and the capacity recovery rate for each one of the batteries prepared.

The batteries with no acetic anhydride applied show a very large capacity decrease after the storage at 60° C. for 4 weeks. On the other hand, the batteries with acetic anhydride added have high values in both capacity holding rate and in capacity recovery rate. Especially, with 0.002 to 1.0 mol/liter acetic anhydride concentrate, the capacity holding rate is more than 80% and the capacity recovery rate is 85. This fact shows that the inclusion of acetic anhydride in the non-aqueous electrolyte has the effect of suppressing the capacity decrease due to storing batteries at a high temperature.

TABLE 1

| Acetic Anhydride Concentration (mol/liter) | Capacity Holding Rate (%) | Capacity Recovery Rate (%) |
|---|---|---|
| 0 | 48.0 | 65.0 |
| 0.001 | 79.0 | 88.0 |
| 0.002 | 84.0 | 92.3 |
| 0.005 | 84.5 | 92.6 |
| 0.008 | 84.5 | 93.7 |
| 0.01 | 85.0 | 94.5 |
| 0.02 | 86.0 | 93.4 |
| 0.05 | 86.0 | 93.4 |
| 0.1 | 86.2 | 92.0 |
| 0.2 | 84.8 | 90.2 |
| 0.5 | 83.2 | 89.6 |
| 0.8 | 82.3 | 88.7 |
| 1.0 | 81.0 | 87.6 |
| 1.5 | 68.0 | 72.6 |
| 2.0 | 59.4 | 68.4 |

EXAMPLE 2

The effect of using benzoic anhydride is examined next.

Batteries are prepared according to Example 1 except for having acetic anhydride replaced by benzoic anhydride and also high temperature storage tests are conducted in the same manner as in Example 1.

Figure 3:
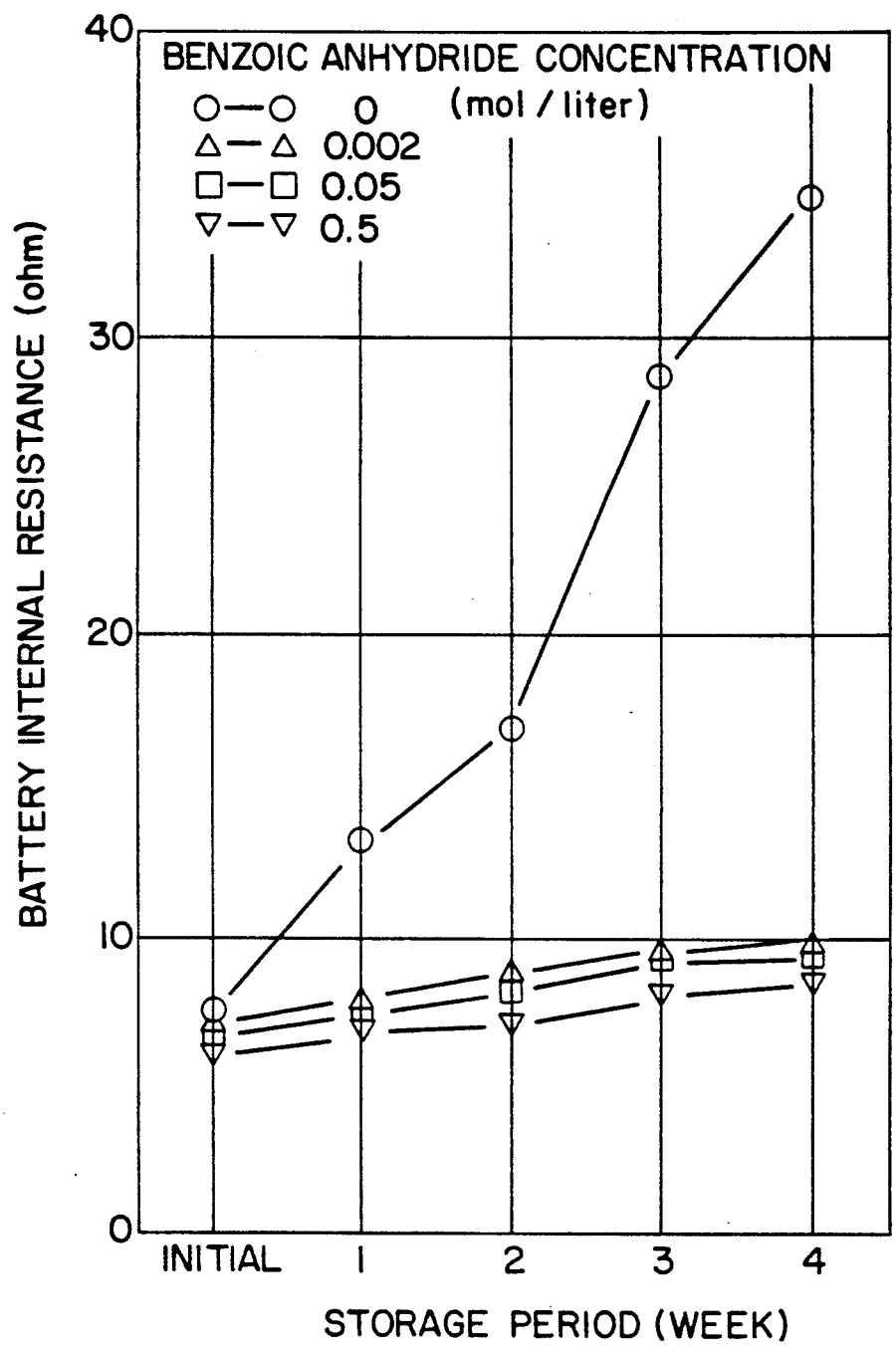
FIG. 3 is a graph to show changes in the internal resistance of the battery explained in Example 2 and stored at 60 C.

FIG. 3 shows changes in the internal resistance of the above batteries after a 4 week storage at 60° C.

According to the data of FIG. 3, the battery prepared for a reference purpose with no benzoic anhydride added shows a sharp increase in the internal resistance immediately after the start of storage, reaching more than 30 ohms after a 4 week storage at 60° C. Compared with this, the batteries of this invention's embodiment show a small increase of the internal resistance.

Table 2 shows the capacity holding rate and the capacity recovery rate of each one of those batteries prepared.

The battery with no benzoic anhydride added shows a very large capacity drop after a 4 week storage at 60° C. However, the batteries of this example, especially the ones with the benzoic anhydride additive concentrate ranging from 0.002 to 1.0 mol/liter show a capacity holding rate of more than 75% and a capacity recovery rate of higher than 80%. In other words, adding benzoic anhydride to a non-aqueous electrolyte has the effect of suppressing the capacity reduction after a high temperature storage.

Moreover, the same effect is observed when succinic anhydride, phtalic anhydride or maleic anhydride is used as an acid anhydride.

Among the various kinds of acid anhydride examined, acetic anhydride has the most remarkable effect upon the high temperature storage characteristics.

TABLE 2

| Benzoic Anhydride Concentration (mol/liter) | Capacity Holding Rate (%) | Capacity Recovery Rate (%) |
| --- | --- | --- |
| 0 (No addition) | 48.0 | 660.0 |
| 0.001 | 75.5 | 84.2 |
| 0.002 | 80.2 | 87.6 |
| 0.005 | 80.1 | 88.1 |
| 0.008 | 80.0 | 88.6 |
| 0.01 | 81.4 | 89.4 |
| 0.02 | 82.4 | 88.8 |
| 0.05 | 82.5 | 88.4 |
| 0.1 | 82.7 | 87.3 |
| 0.2 | 79.9 | 85.1 |
| 0.5 | 78.4 | 84.2 |
| 0.8 | 77.4 | 83.8 |
| 1.0 | 76.3 | 82.0 |
| 1.5 | 64.2 | 66.3 |
| 2.0 | 54.3 | 63.0 |

As described in the foregoing, production of non-aqueous electrolyte secondary batteries of excellent high temperature storage characteristics is made possible by applying acid anhydride into the non-aqueous electrolyte on non-aqueous electrolyte batteries.

This example has explained the case where $LiCoO_2$ is used as a positive active material. It is needless to say that other 4 V class positive active materials such as $LiMn_2O_4$ and $LiNiO_2$ will provide the same effect. This is easily understandable from this example wherein reduction of water or alkali contents is assumedly taking place within a battery.

Moreover, the same effect is observed even when a mixture of these acid anhydrides is employed.

The examples of the foregoing show the test results of using a propylene carbonate solution with 1 mol/liter of lithium perchorate dissolved as the electrolyte to which acid anhydrides are applied. The other electrolytes that employ, as the solute, lithium phosphate hexafluoride, triphloromethane lithium sulfonic acid or boric lithium fluoride and emply, as the solvent, carbonates like propylene carbonate, ethylene carbonate, etc. and esters such as gammabutyrolactone, methyl acetate, etc. show a good performance.

However, when such ethers as dimethoxyethane, tetrahydrofuran, etc. are used the high temperature storage characteristics are not good and no improvement is observed in the high temperature storage characteristics by applying acid anhydride into the electrolyte. Since the positive electrolyte voltage reaches higher than 4 V with the examples of this invention, oxidation of the ethers used is assumedly taking place.

As clarified by the explanation made in the foregoing examples, this invention makes it possible to produce a non-aqueous electrolyte secondary battery of excellent high temperature storage characteristics that has positive and negative electrodes with the polarity reversible according to charge and discharge cycles and also has the non-aqueous electrolyte to contain lithium salts with a further addition of acid anhydride to it and consequently contributes to the great benefit of the industry.

What is claimed is:

1. A non-aqueous electrolyte secondary battery, comprising:

a rechargeable positive electrode and a rechargeable negative electrode; and a non-aqueous electrolyte including a lithium salt, an acid anhydride selected from the group consisting of benzoic anhydride, phthalic anhydride and maleic anhydride, wherein said acid anhydride is included in a concentration ranging from 0.002 to 1.0 mol/liter, and at least one solvent selected from the group consisting of organic carbonates and organic esters, and further wherein the capacity holding rate of said battery is greater than 80% following storage of said battery at 60° C. for four weeks.

2. A non-aqueous electrolyte secondary battery according to claim 1, wherein said rechargeable positive electrode includes at least one active material selected from the group consisting of $LiCoO_2$, $LiMn_2O_2$ and $LiNiO_2$.

3. A non-aqueous electrolyte secondary battery according to claim 1, wherein said organic carbonates are at least one selected from the group consisting of propylene carbonate and ethylene carbonate and said organic esters are at least one selected from the group consisting of gammabutyrolactone and methyl acetate.

* * * * *